United States Patent Office 3,026,299
Patented Mar. 20, 1962

3,026,299
TRIOXANE COPOLYMERS
Raymond J. Kray and Charles A. Defazio, Summit,
N.J., assignors to Celanese Corporation of America,
New York, N.Y., a corporation of Delaware
No Drawing. Filed Mar. 26, 1959, Ser. No. 802,024
11 Claims. (Cl. 260—67)

This invention relates to novel copolymers of high thermal stability and particularly to copolymers of trioxane.

Polyoxymethylene polymers, having recurring

—CH$_2$O— units have been known for many years. They may be prepared by the polymerization of anhydrous formaldehyde or by the polymerization of anhydrous formaldehyde or by the polymerization of trioxane which is a cyclic trimer of formaldehyde.

It is known that trioxane may be polymerized to produce a moldable polymer of high thermal stability, particularly in the presence of a boron fluoride containing catalyst such as a boron fluoride coordinate complex with an organic compound in which oxygen or sulfur is the donor atom.

It has now been found that useful moldable polymers comprising oxymethylene groups and groups of the formula

wherein R is a divalent hydrocarbon radical, may be obtained by copolymerizing trioxane with a lactone.

The preferred lactones are those wherein R is alkylene, aralkylene or alicyclic-substituted alkylene and having at least five members in the lactone ring, such as gamma-butyrolactone, delta-valerolactone, epsilon-caprolactone and phthalide. These lactones produce groups of the above formula wherein R has at least three carbon atoms directly in the chain. For example, gamma-butyrolactone produces

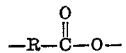

and phthalide produces

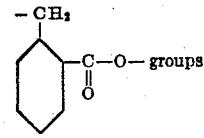

The preferred catalysts used in the preparation of the desired copolymers are the boron fluoride coordinate complexes with organic compounds in which oxygen or sulfur is the donor atom.

The coordinate complex of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether is the preferred coordinate complex. Boron fluoride dibutyl etherate is also highly desirable. The boron fluoride complexes which may be used include complexes with ethanol, with methanol, with propanol, with butanol, with methyl acetate, with ethyl acetate, with phenyl acetate, with benzoic acid, with acetic anhydride, with acetone, with methylethyl ketone, with dimethyl ether, with methylphenyl ether, with acetaldehyde, with chloral, with dimethyl sulfide and with ethyl mercaptan.

Coordinate complexes of boron fluoride with water, such as boron fluoride monohydrate, boron fluoride dihydrate and boron fluoride trihydrate may also be used.

The coordinate complex or boron fluoride should be present in the polymerization zone in an amount such that its boron fluoride content is between about 0.001 and about 1.0 weight percent based on the weight of trioxane in the polymerization zone. Preferably, amounts between about 0.003 and about 0.1 weight percent should be used.

The trioxane and the lactone in the reaction zone are preferably anhydrous or substantially anhydrous. Small amounts of moisture, such as may be present in commercial grade feed materials or may be introduced by contact with atmospheric air will not prevent polymerization, but should be removed for best yields.

In one embodiment of this invention the trioxane is polymerized in its molten state with the comonomer and catalyst dissolved therein. The preferred temperature for such polymerization is between about 0° and about 100° C. The period of reaction for such polymerization may vary from about 2 minutes to about 72 hours. Pressures from subatmospheric to about 100 atmospheres, or more, may be used, although atmospheric pressure is preferred.

In another embodiment of this invention, the trioxane, comonomer and catalyst are dissolved in a common anhydrous solvent, such as benzene or cyclohexane, and permitted to react. The temperature for solution polymerization of this type may vary from about 10° C. to about 85° C. The period of reaction in such polymerization may vary from about ½ hour to about 72 hours.

In producing the oxymethylene-lactone copolymers of this invention the mol ratio of the lactone may vary from about 0.005 to about 5 mols of lactone per mol of trioxane in the reaction zone. Preferably, the mol ratio may vary from about 0.2 to about 1.5 mols of lactone per mol of trioxane.

*Example I*

Trioxane, 44.1 g.; gamma-butyrolactone (B.P. 92–93/21 mm.) 18.1 g.; and boron trifluoride diethyl etherate, 0.10 ml. were charged to a stainless steel polymerization tube. The tube was placed in a constant temperature bath at 90° C. and rotated end-over-end at 40 r.p.m. for 17 hours. The product was then removed from the tube and washed twice for 15 minute periods with water at 80° C. When dried in an air oven at 60° C. the copolymer weighed 35.5 g. (57% yield) and had a melting point of 180° C. The saponification equivalent was 47.6 meq./g. of polymer which corresponds to a copolymer analyzing 18.1% by weight of groups derived from gamma-butyrolactone and 81.9% by weight of groups derived from trioxane.

*Example II*

Trioxane, 25 grams; gamma-butyrolactone (B.P. 92–93/21 mm.), 25 grams; and boron trifluoride diethyl etherate, 0.10 ml. were charged to a stainless steel polymerization tube. The tube was placed in a constant temperature batt at 70° C. and rotated end-over-end at 40 r.p.m. for 17 hours. The polymer was removed from the tube and washed with methanol containing 1 ml. of tributyl amine. The polymer was washed twice again with pure methanol and then dried in an air oven at 60° C. The product weight 13.9 g. (38.6% yield) and had a melting point of 168–174° C. and inherent viscosity of 0.45 (0.1% in 98% p-chlorophenol/2% alpha-pinene at 60° C.). The saponification number was 4.91 which corresponded to a copolymer composition of 21% by weight of groups derived from gamma-butyrolactone and 79% by weight of oxymethylene groups. Infra-red examination showed the presence of carbonyl groups.

*Example III*

A mixture of 26.4 g. of trioxane and 26.4 g. of phthalide were heated to 36° C. (at which temperature a single liquid phase is formed) and the molten liquid was poured into a stainless steel tube. 0.3 ml. of boron trifluoride dibutyl etherate was added and an immediate exotherm was noticed. The tube was sealed and placed in a constant temperature bath at 45° C. where it was rotated end-over-end at 40 r.p.m. for 1 hour. The polymer was then removed from the tube and given three acetone washes, the first of which contained also 5 ml. of tributyl amine. The yield of dried polymer was 17.19 g. or 32.4% based on total charge of monomers. The melting point of the polymer was 150–159° C. The inherent viscosity of the polymer was 0.17 (0.1% in 98/2 p-p-chlorophenol/alphapinene at 60° C.). The saponification number was 1.33 meq./gm. which corresponds to a copolymer containing 83% by weight of oxymethylene groups and 17% by weight of groups derived from phthalide.

It is to be understood that the foregoing detailed description is given merely by way of illustration and that many variations may be made therein without departing from the spirit of our invention.

Having described our invention what we desire to secure by Letters Patent is:

1. A normally solid copolymer consisting essentially of oxymethylene groups and from 0.5 to 50 mol percent of groups of the formula $$-R-\overset{O}{\underset{\|}{C}}-O-$$

wherein R is a divalent hydrocarbon radical having at least 3 carbon atoms directly in the polymer chain and where R is identical with the R in a lactone of the formula

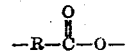

2. A normally solid copolymer consisting essentially of oxymethylene groups and from 0.5 to 50 mol percent of groups of the formula

3. A normally solid copolymer consisting essentially of oxymethylene groups and groups of the formula

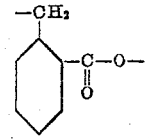

4. A normally solid copolymer consisting essentially of oxymethylene groups and from 0.5 to 50 mol percent of groups of the formula

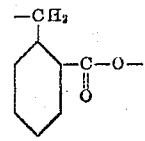

5. A method of preparing a moldable polymer which comprises copolymerizing trioxane and from 0.5 to 50 mol percent of a lactone having at least 5 members in its lactone ring in the presence of a boron fluoride-containing catalyst.

6. A method of preparing a moldable polymer which comprises copolymerizing trioxane and gamma-butyrolactone in the presence of a boron fluoride-containing catalyst.

7. A method of preparing a moldable polymer which comprises polymerizing trioxane and a lactone having at least 5 members in its lactone ring in contact with a catalyst comprising a boron fluoride coordinate complex with an organic compound in which oxygen is the donor atom.

8. A method of preparing a moldable polymer which comprises copolymerizing trioxane and phthalide in the presence of a boron fluoride-containing catalyst.

9. A method of preparing a moldable copolymer which comprises maintaining trioxane and from 0.005 to 5 moles of a lactone having at least 5 members in its lactone ring per mole of trioxane in a polymerization zone in contact with a catalyst comprising a boron fluoride coordinate complex with an organic compound in which oxygen is the donor atom, at a temperature between about 0° and about 100° C., until a solid polymer is formed, said catalyst being present in said polymerization zone in an amount between about 0.001 and 1.0 weight percent, based on its boron fluoride content and the weight of trioxane.

10. The method of claim 9 wherein said lactone is gamma-butyrolactone.

11. The method of claim 9 wherein said lactone is phthalide.

References Cited in the file of this patent

UNITED STATES PATENTS 2,373,561  Hanford _____ Apr. 10, 1945